United States Patent
Wang (10) Patent No.: US 7,172,166 B2
(45) Date of Patent: Feb. 6, 2007

(54) GENERAL COMPUTER HOST MOUNTING SHELF

(75) Inventor: Chia-Ming Wang, Shenkeng Township, Taipei County (TW)

(73) Assignee: Sallas Industrial Co., Ltd., Taipei County (TW)

( * ) Notice: Subject to any disclaimer, the term of this patent is extended or adjusted under 35 U.S.C. 154(b) by 56 days.

(21) Appl. No.: 11/067,696

(22) Filed: Mar. 1, 2005

(65) Prior Publication Data

US 2006/0138294 A1 Jun. 29, 2006

(30) Foreign Application Priority Data

Dec. 27, 2004 (TW) .............................. 93140701 A (51) Int. Cl.
*A42H 1/10* (2006.01)
(52) U.S. Cl. ....................... 248/317; 248/326; 248/917
(58) Field of Classification Search ................ 248/317, 248/320, 326, 333, 339, 671; 108/26, 50.02, 108/143, 147.21; 312/223.3, 334.23
See application file for complete search history.

(56) References Cited

U.S. PATENT DOCUMENTS 6,012,694 A * 1/2000 Sullivan, III ................ 248/323
6,029,580 A * 2/2000 Alfonso et al. ............... 108/26
6,073,892 A * 6/2000 Dittmer ....................... 248/157

* cited by examiner

*Primary Examiner*—Ramon O Ramirez
(74) *Attorney, Agent, or Firm*—Rosenberg, Klein & Lee (57) ABSTRACT

A general computer host mounting shelf engages a bottom deflecting bar of a set of bottom fixing bars into a lower engagement bar of an engagement socket and engage a side deflecting bar of a set of side fixing bars into an upper engagement bar of an engagement socket. The other ends of the bottom deflecting bar and the side deflecting bar are connected to a bottom connecting bar and a side connecting bar, respectively, to further combine a placing space. Further, a locating button is set at one end of the bottom deflecting bar, and at least one locating hole is set on the lower engagement bar corresponding to a position of the locating button such that when the set of bottom fixing bars slide corresponding to the engagement socket, an object of localization can be achieved by engaging the locating button and the locating hole. Therefore, when the users are operating, under the circumstances without using any tools, the size of the placing space can be adjusted quickly, and provided an object of stably carrying various computer hosts.

9 Claims, 9 Drawing Sheets

GENERAL COMPUTER HOST MOUNTING SHELF

FIELD OF THE INVENTION

The present invention is related to a mounting shelf, and more particularly to a general computer host mounting shelf for quickly adjusting the size of the placing space without any tools and providing an object of stably carrying various computer hosts is achieved.

BACKGROUND

By the vigorous development of electrical technology, no matter in houses, offices, factories, or public places, electrical equipments can almost be seen everywhere. Among other things, personal computers are totally attuned into daily lives. However, the personal computer equipments nowadays must occupy quite a placing space of the user, especially the host part of the personal computers. It not only has biggest volume and has quite a weight. Further, it has to connect to magnetic disk drive and optical disk drive and has many connecting wires, such as power core, screen core, keyboard core, mouse core, printer core, or network core, etc. Therefore, the placing position and acceptance of the host of the personal computer are important issues. It needs to be places in a proper position, and has to have convenience in operation and maintenance.

Figure 1:
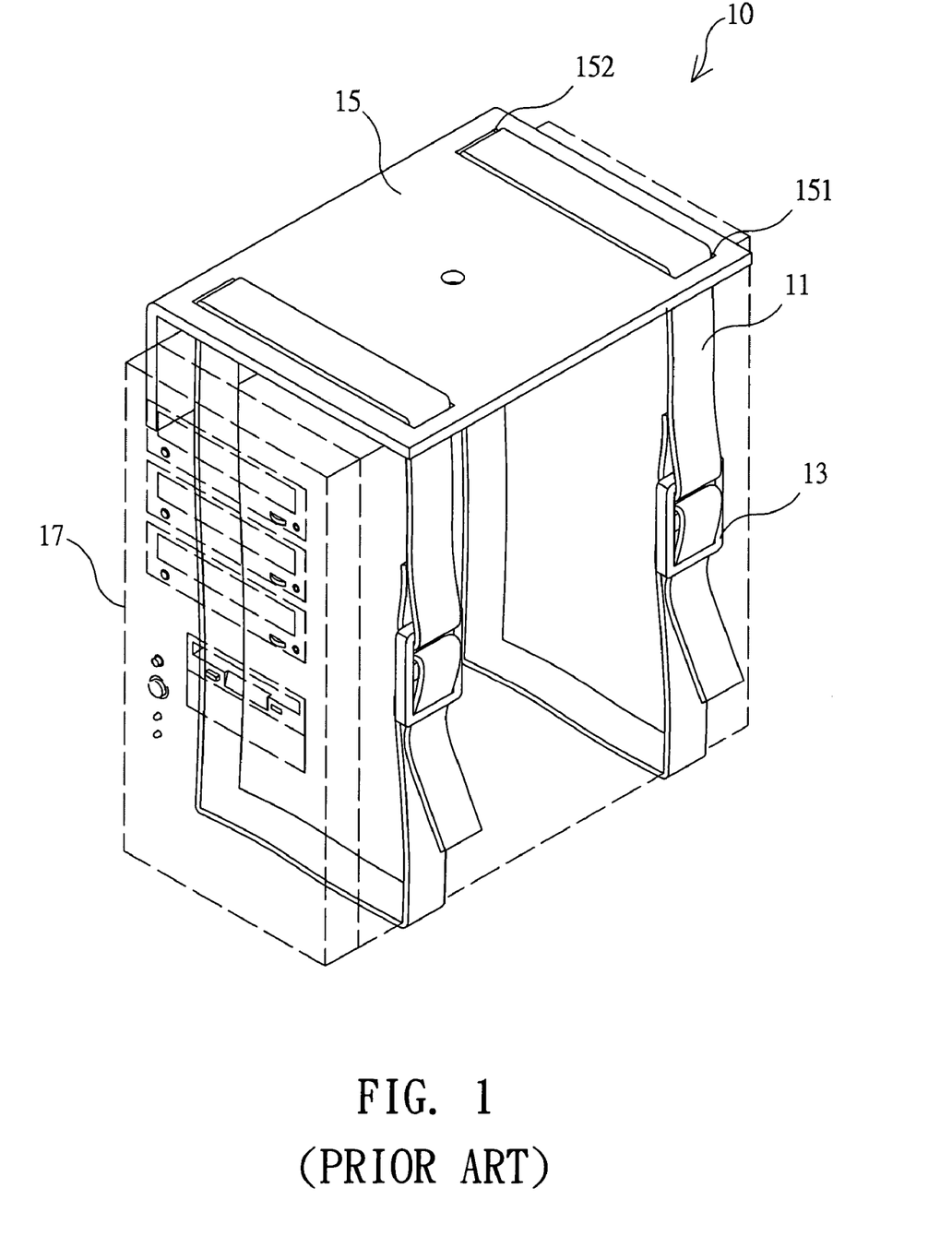
FIG. 1 is a stereoscopic diagram of a prior art rope fixing shelf.

Thus, generally, a prior art rope fixing shelf 10 is used to place a host 17 of a personal computer at a proper position considered by the user, as shown in FIG. 1. The main structure comprises: at least one rope 11 whose one end is fixed at one end of a buckle 13, and the other end of the rope 11 passes through a first hole 151 and a second hole 152 of a fixing shelf 15 sequentially, then wraps a host 17 of a personal computer, and properly passes through the other end of the buckle 13 to represent a alias aspect thereby fixing the host 17 of the personal computer to the default placing position, such as hanging under the desk, working table, or office desk, thereby an objection of acceptance is achieved.

Although the previous mentioned prior rope fixing shelf 10 is convenient in assembling and operating, it ignores the following points:
1. Using the rope to wrap the host of the personal computer and placing under the desk, when the user carelessly touches the host of the personal computer in processing, it will whirl such that the elements installed in the host of the personal computer, such as HD, CD ROM, or DVD ROM, etc., will be swung accordingly. However, these electrical elements are afraid of any vibration occurring in processing because vibrations not only easily cause the error in accessing data, but also increase unrecoverable damage.
2. Only simply using two ropes to wrap the host of the computer with quite a weight, it could be hanged under the desk, but no elements are placed to keep the distance between both ropes. Therefore, when the user carelessly touches in processing, the ropes are easily caused to shift such that the host of the computer falls out and may be damaged.

SUMMARY OF THE INVENTION

Accordingly, how to design a new general computer host mounting shelf, which no tools are needed to quickly adjust the size of the placing space and an object of stable carrying various computer hosts is achieved with respect to the previous mentioned shortcomings of the prior art rope fixing shelf is the key point of the present invention. Therefore, It is a primary object of the present invention to provide a general computer host mounting shelf. The locking of the locating button and the locating hole is used to produce an effect of quick localization. Further, no tools are needed to adjust the size of the placing space, so any size of host of computer can be placed therein.

It is a secondary object of the present invention to provide a general computer host mounting shelf. The combination of the locating hook and the side open socket is used to quickly adjust the size of the placing space, and non-slip pads are set on proper positions of the set of side fixing bars and the set of bottom fixing bars, respectively to effectively avoid the shortcoming of the host sliding out of the placing space.

It is another object of the present invention to provide a general computer host mounting shelf. By a design of an adaptor, it can be fixed on a moving bar to further make the use of the mounting shelf of the host of the computer convenient.

To achieve the previous mentioned objects, the present invention provides a general computer host mounting shelf whose structure mainly comprises: a set of bottom fixing bars comprising at least one bottom deflecting bar, a locating button set at an end of the bottom deflecting bar, and a bottom connecting bar traversing to connect to the other end of the bottom deflecting bar; a set of side fixing bars comprising at least one side deflecting bar, a side connecting bar traversing to connect to an end of the side deflecting bar; and an engagement socket comprising a substrate thereon at least one hollow upper engagement bar and at least one hollow lower engagement bar set; wherein the side deflecting bar and the upper engagement bar can be engaged with each other, and at least one locating hole is chiseled at a position on the lower engagement bar corresponding to the locating button, such that when the bottom deflecting bar and the lower engagement bar are engaged with each other, an object of localization can be achieved by engaging the locating button and the locating hole.

Further, to achieve the previous mentioned objects, the present invention further provides a general computer host mounting shelf whose structure mainly comprises: a set of bottom fixing bars comprising at least one bottom deflecting bar, a locating button set at an end of the bottom deflecting bar, and a bottom connecting bar traversing to connect to the other end of the bottom deflecting bar; a set of side fixing bars comprising at least one side deflecting bar, a side connecting bar traversing to connect to an end of the side deflecting bar; and an adapter thereon at least one upper engagement bar and at least one lower engagement bar pivoted; wherein the side bar and the upper engagement bar can be engaged with each other, and at least one locating hole is chiseled at a position on the lower engagement bar corresponding to the locating button, such that when the bottom deflecting bar and the lower engagement bar are engaged with each other, an object of localization can be achieved by engaging the locating button and the locating hole.

Further, to achieve the previous mentioned objects, the present invention further provides a general computer host mounting shelf whose structure mainly comprises: a set of bottom fixing bars comprising at least one bottom deflecting bar, a rotatable locating hook set at one end of the bottom deflecting bar, and a bottom connecting bar traversing to connect to the other end of the bottom deflecting bar; a set of side fixing bars comprising at least one side deflecting bar, a side connecting bar traversing to connect to an end of the side deflecting bar; and an engagement socket comprising a substrate thereon at least one hollow upper engagement bar and at least one hollow lower engagement bar set; wherein the side deflecting bar and the upper engagement bar can be engaged with each other, and a bar socket is set on the lower engagement bar corresponding a hook position of the locating hook, and at least one side open sockets are connected to the bar socket, such that when the bottom deflecting bar and the lower engagement bar are engaged with each other, an object of localization can be achieved by engaging the locating hook and the side open socket.

DETAILED DESCRIPTION

The structural features and the effects to be achieved may further be understood and appreciated by reference to the presently preferred embodiments together with the detailed description.

Figure 2A:
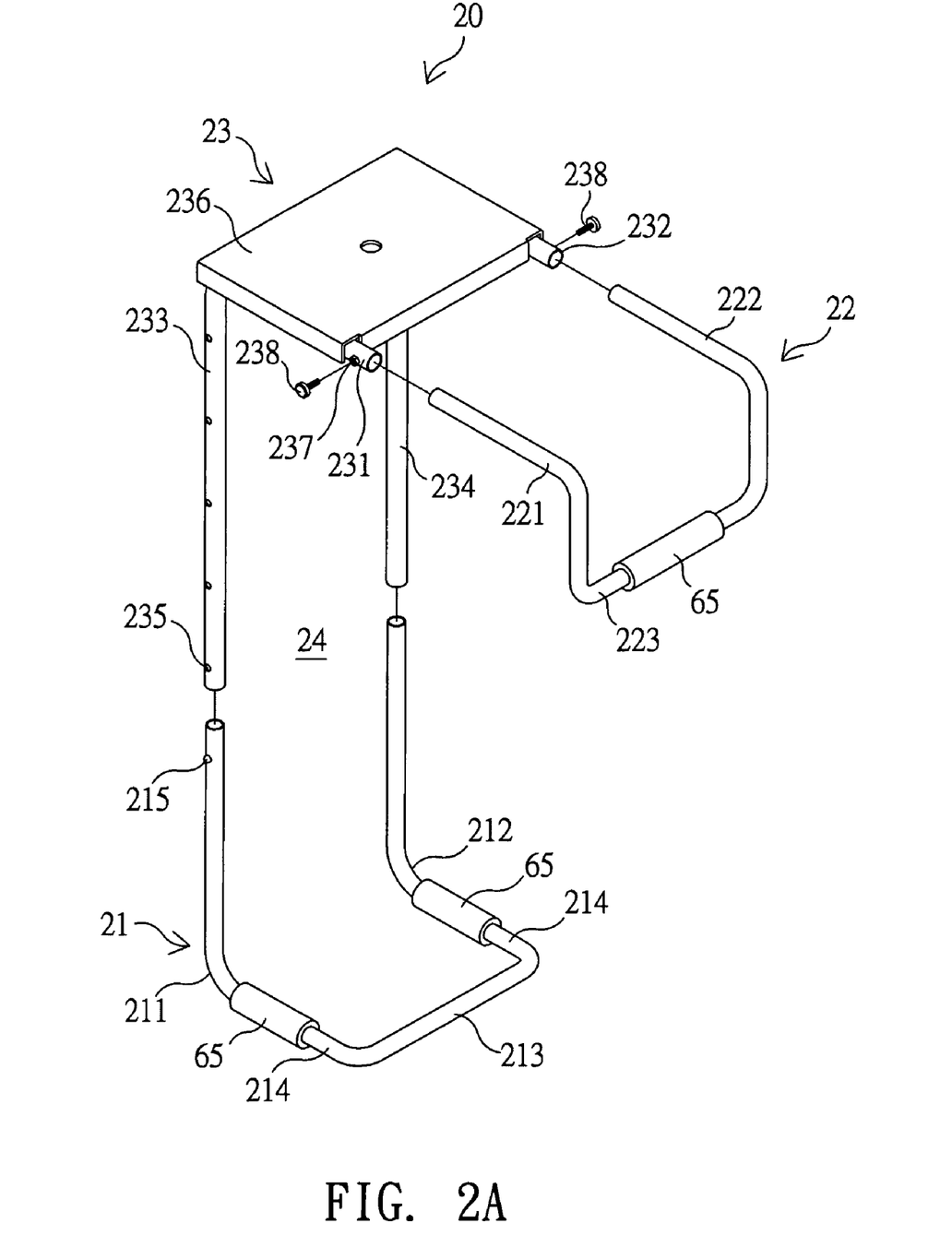
FIGS. 2A and 2B are respectively a stereoscopic explosion and stereoscopic assemble diagrams of a preferred embodiment of the present invention.
Figure 2B:
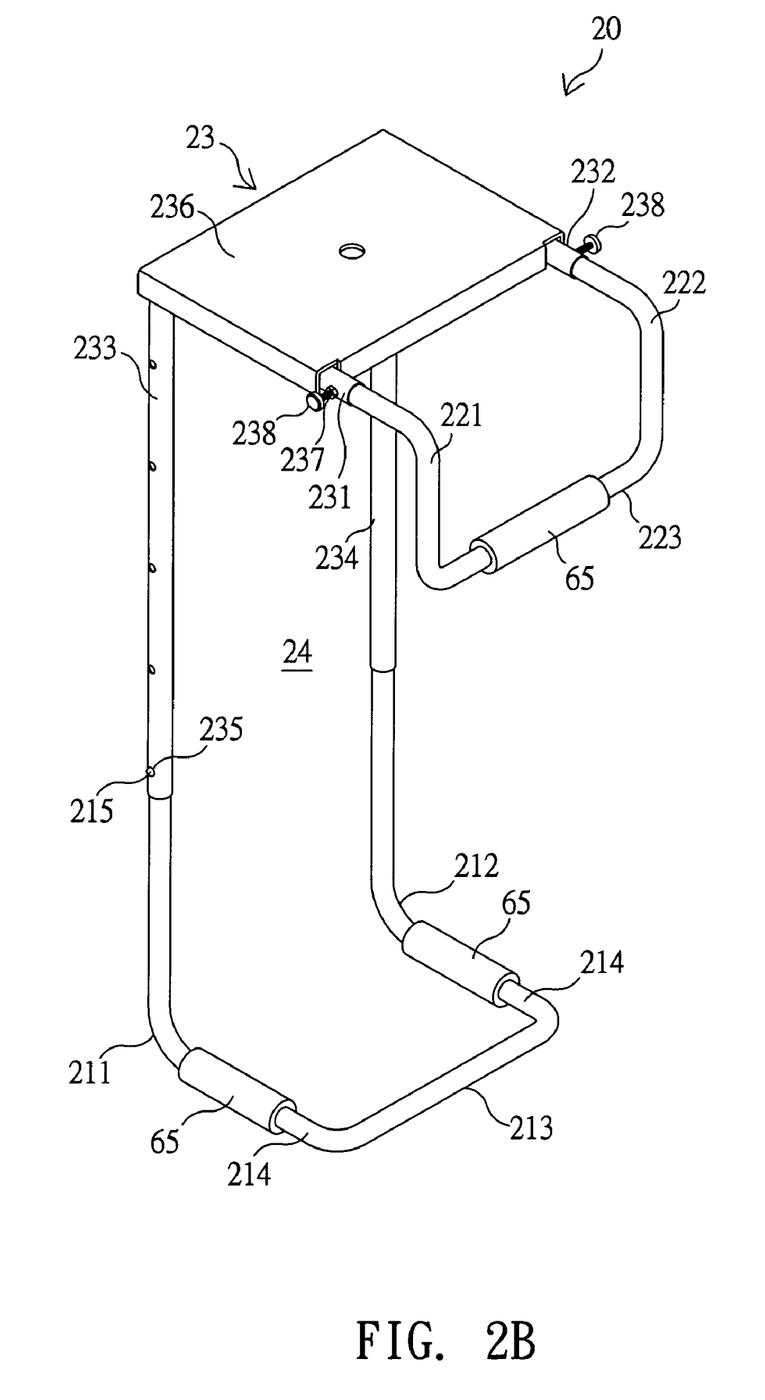

Firstly, referring to FIGS. 2A and 2B, respectively a stereoscopic explosion and stereoscopic assemble diagrams of a preferred embodiment of the present invention. As shown, the main structure of the present invention comprises:

A set of bottom fixing bars 21 is consisted of a first bottom deflecting bar 211, a second bottom deflecting bar 212, and a bottom connecting bar 213. One and of the first bottom deflecting bar 211 and the second bottom deflecting bar 212 can traverse to connect to the bottom connecting bar 213. A locating button 215 is set at the other end of the first bottom deflecting bar 211 and the second bottom deflecting bar 212, respectively;

A set of side fixing bars 22 traverses connecting both ends of a side connecting bar to a first side deflecting bar 221 and a second side deflecting bar 222, respectively;

A engagement socket 23 sets a hollow first upper engagement bar 231, a second upper engagement bar 232, a first lower engagement bar 233, and a second lower engagement bar 234, respectively, on a substrate 236.

Figure 3:
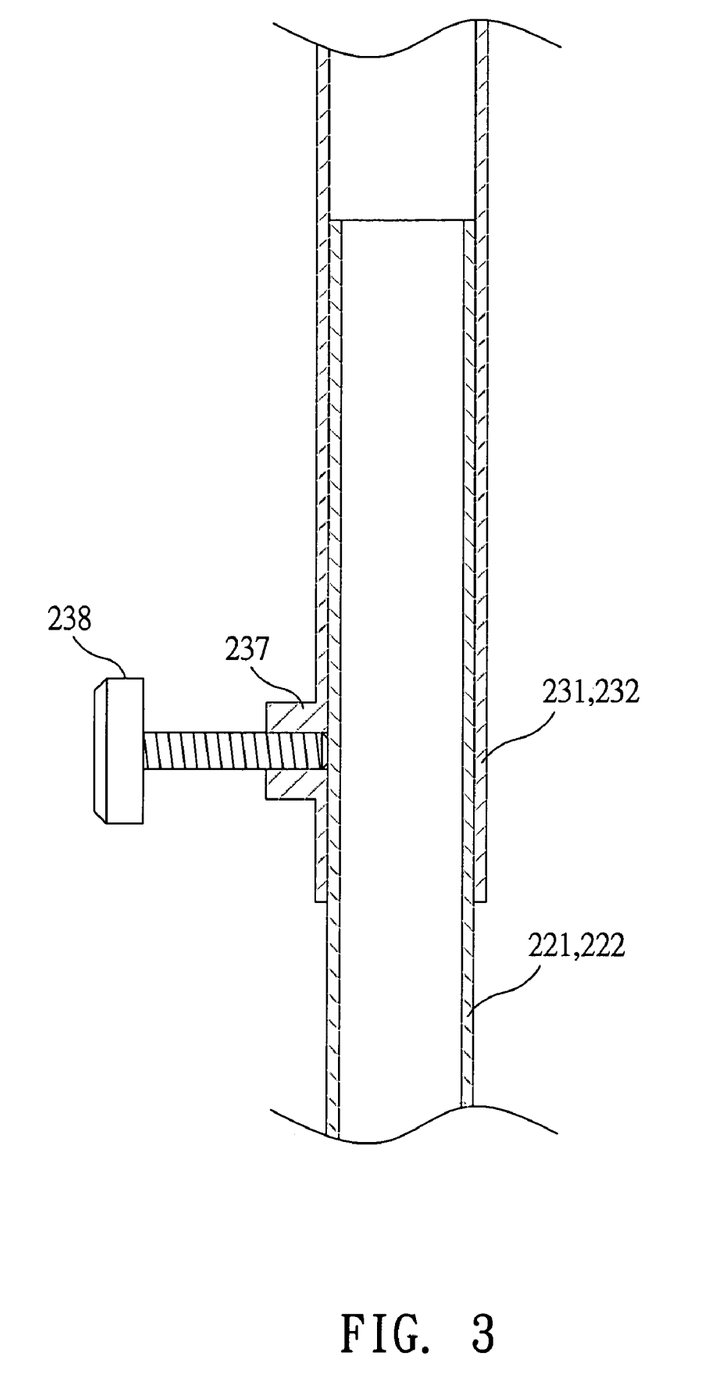
FIG. 3 is a profile diagram of the set of the side fixing bars of the present invention in fixing.

Wherein, the fist side deflecting bar 221 and the second side deflecting bar 222 can be engaged into the first upper engagement bar 231 and the second upper engagement bar 232, and a locking element 238 is used to lock through the locking holes 237 on the first upper engagement bar 231 and the second upper engagement bar 232, and then right close to the fist side deflecting bar 221 and the second side deflecting bar 222, as shown in FIG. 3. Further, at least one locating hole 235 is chiseled on a position corresponding to the locating button 215 on the first lower engagement bar 233 and a second lower engagement bar 234, respectively, such that when the first bottom deflecting bar 211 and the second bottom deflecting bar 212 engage with the first lower engagement bar 233 and a second lower engagement bar 234, respectively, an object of localization by the engagement of the locating button 215 and the locating hole 235.

Further, a placing space 24 is properly formed by assembling the set of bottom fixing bars 21, the set of side fixing bars 22, and the engagement socket 23.

Further, a non-slip pad 65 can be added at a proper position at the set of bottom fixing bars 21 or the set of side fixing bars 22 of the computer host mounting shelf 20. This way, not only the personal computer host 49 can be placed in the placing space 24 more securely, but also rubbing baking varnish of the housing of the personal computer host 49 can be avoided effectively. Of course, the first bottom deflecting bar 211, the bottom connecting bar 213, and the second bottom deflecting bar 212 can be formed integrally. The first side deflecting bar 221, the side connecting bar 223, and the second side deflecting bar 222 can also be formed integrally. The first upper engagement bar 231 and the first lower engagement bar 233 can be formed integrally. The second upper engagement bar 232 and the second lower engagement bar 234 can be formed integrally. An object of saving the materials can be achieved.

Figure 4:
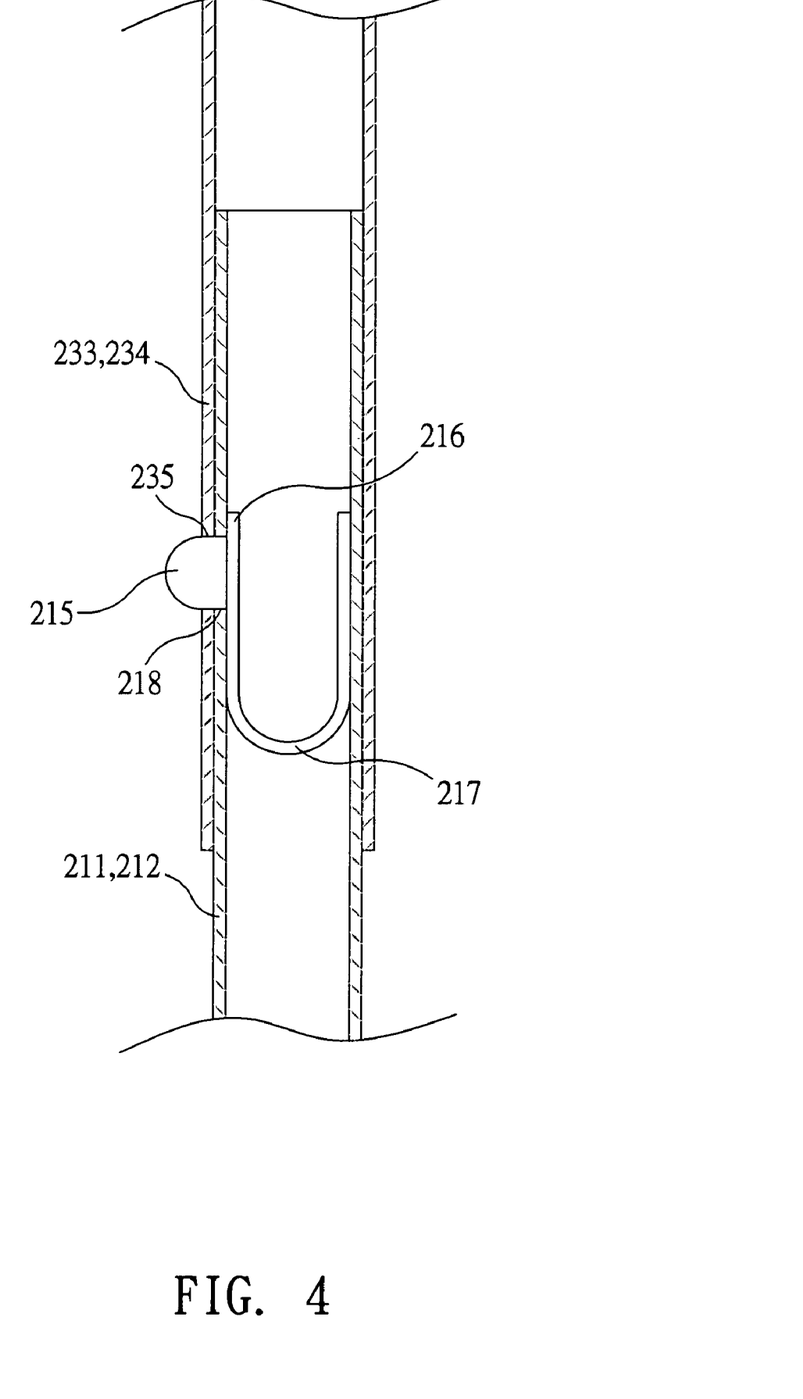
FIG. 4 is a profile diagram of the set of the bottom fixing bars of the present invention in fixing.

Further, referring to FIG. 4, a profile diagram of the set of the bottom fixing bars of the present invention in fixing. As shown, the bottom of the locating button 215 of the set of bottom fixing bars 21 connects to a flange 216 and an elastic object 217. The flange 216 and the elastic object 217 are fixed at the inner edge of the penetration hole 218 of the first bottom deflecting bar 211 or the second bottom deflecting bar 212 such that the locating button 215 can access the penetration hole 218. When the user presses the locating button 215 to make it sink into the first bottom deflecting bar 211 or the second bottom deflecting bar 212, the engagement relationship of the locating hole 235 can be disengaged such that the relative position of the first lower engagement bar 233 and the second lower engagement bar 234 to the first bottom deflecting bar 211 and the second bottom deflecting bar 212 can be adjusted. After selecting the height as needed, the locating button 215 is made to slide to a locating hole 235 of one of the first lower engagement bar 233 or the second lower engagement bar 234. Because of the elastic force of the elastic object 217, the locating button 215 will be automatically ejected from the corresponding locating hole 235 and further has an engagement relationship with the locating hole 235. Thereby, an object of quickly adjusting or locating the relative positions of the first bottom deflecting bar 211, the second bottom deflecting bar 212, the first lower engagement bar 233, and the second lower engagement bar 234 can be achieved.

When the user wants to adjust the size of the placing space 24, no tools are needed. Only the locating button 215 is needed to be pressed and the locking element 238 is needed to be rotated, the size of the placing space 24 can be quickly adjusted to meet the size of various computer hosts. Various computer hosts can also be carried securely.

Figure 5A:
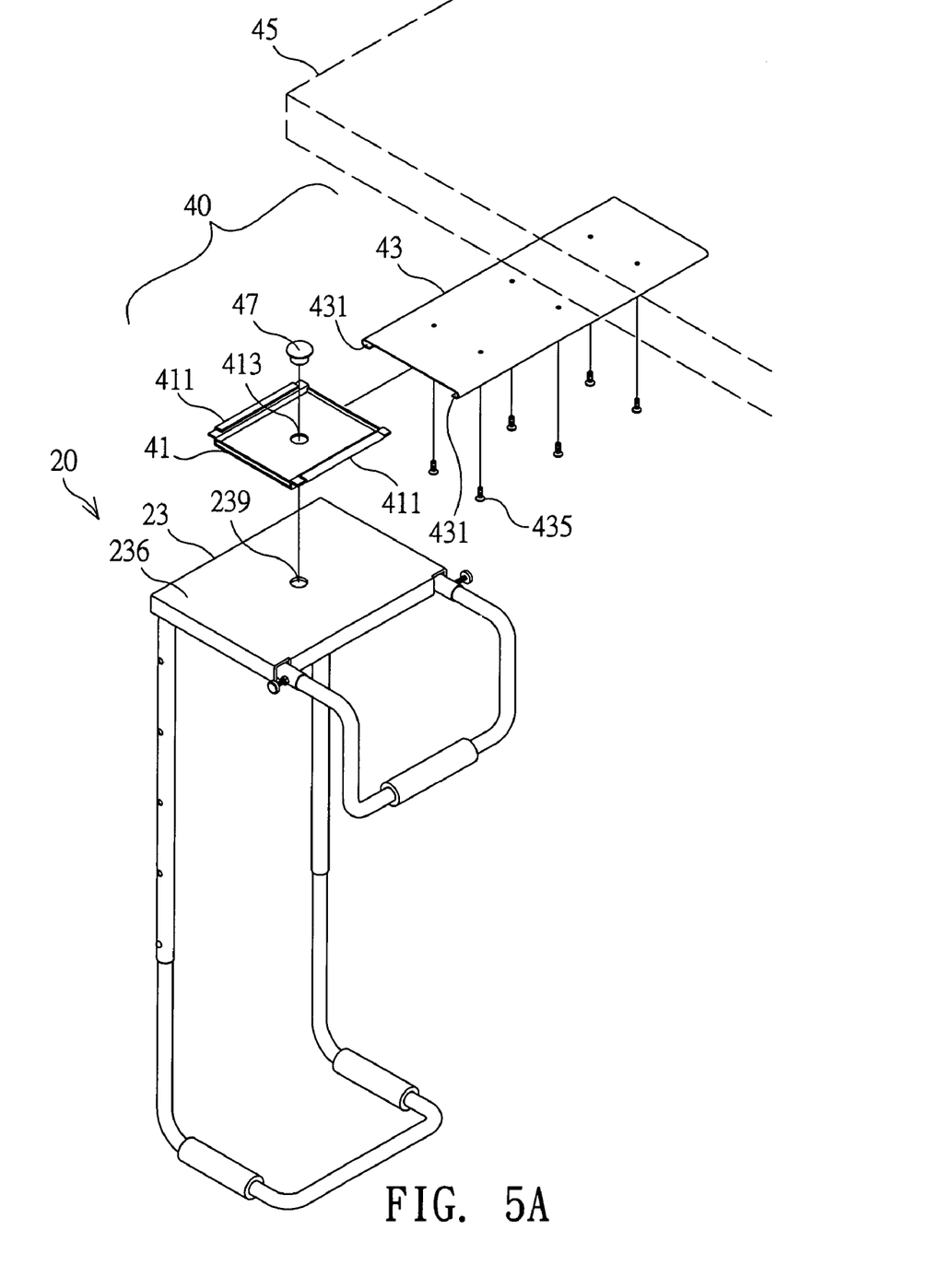
FIGS. 5A and 5B are respectively a stereoscopic explosion and assemble diagrams of a hanging device of the present invention.
Figure 5B:
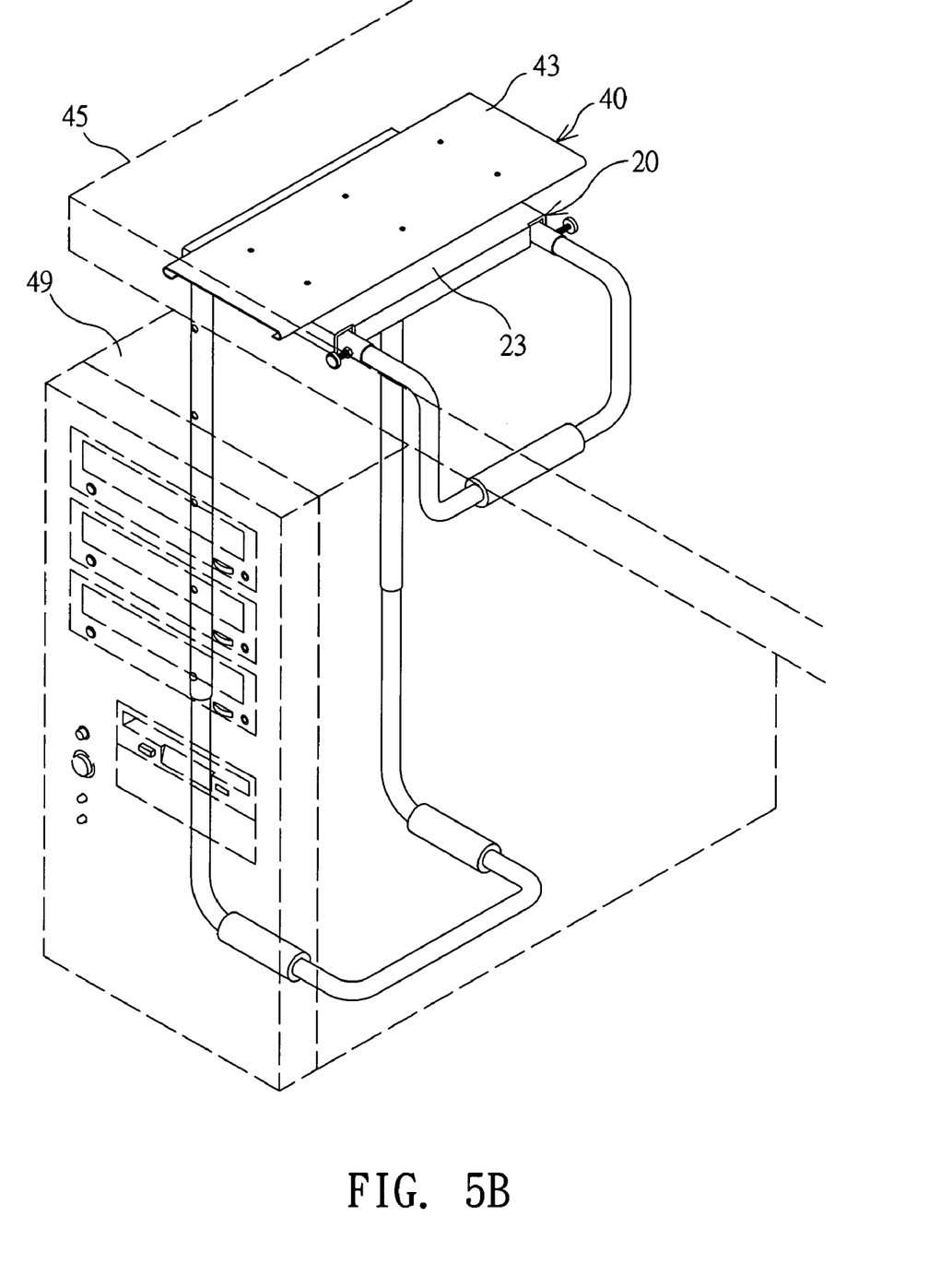

Continuously, referring to FIG. 5A and FIG. 5B at the same time, respectively a stereoscopic explosion and assemble diagrams of a hanging device of the present invention. As shown, a hanging device 40 is mainly consisted of a sliding socket 41 and a rail socket 43. The sliding socket 41 has a sliding socket hole 413 whose both sides have a sliding flange 411, respectively. The two sides of the rail socket 43 also have a sliding rail 431 which can be assembled with the sliding flange 411. The rail socket 43 can further use at least one locking element 435 to fix at the lower surface of a working table 45 such that the sliding socket 41 and the rail socket 43 can be sliding and shifting with each other. Further, a substrate hole 239 is chiseled on the substrate 236 of the engagement socket 23. A pivot element is used to sequentially pivot through the sliding socket hole 413 and the substrate hole 239 to make the engagement socket 23 and the sliding socket 41 rotate toward each other. Further, the personal computer host mounting shelf 20 slides or rotates corresponding to the working table 45. This way, when the user wants to maintain move the personal computer host 49, the personal computer host mounting shelf 20 is only needed to be pulled to achieve an object of moving and rotating the personal computer host 49.

Figure 6:
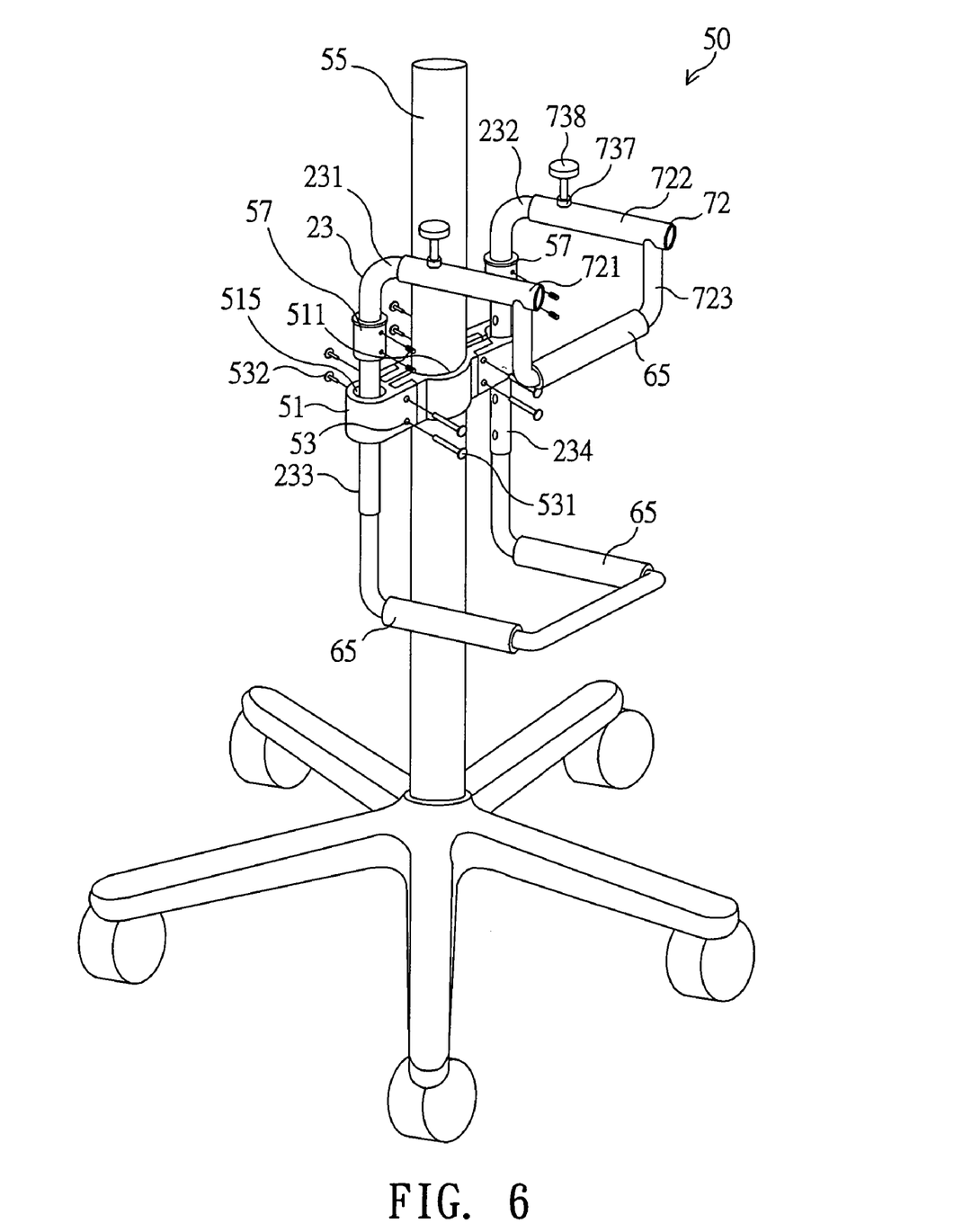
FIG. 6 is a stereoscopic diagram of another embodiment of the present invention.

Furthermore, referring FIG. 6, a stereoscopic diagram of another embodiment of the present invention. As shown, the main structure is generally the same as the embodiment as shown in FIG. 2B. However, the first upper engagement bar 231, the second upper engagement bar 232, the first lower engagement bar 233, and the second lower engagement bar 234 are respectively fixed at an adaptor 51. The adaptor 51 is used to replace the engagement socket (23) of the previous mentioned embodiment. A central adapting hole 511, at least one side adapting hole 515, and at least one locking hole are set on the adaptor 51. A moving bar 55 can be set at the central adapting hole 511. At least one locking element 531 is used to pass through the locking hole 53 and locks with another locking element 532 to lock or adjust the size of the central adapting hole 511 to achieve an object of fixing the adaptor 51 on the moving bar 55.

Further, the first upper engagement bar 231 and the second upper engagement bar 232 can directly engage on the first lower engagement bar 233 and the second lower engagement bar 234. The first lower engagement bar 233 and the second lower engagement bar 234 can pass through the side adapting hole 515. This way, the personal computer host mounting shelf 50 can move according to the moving bar 55 to make the personal computer host mounting shelf 50 more convenient in use.

Further, because the set of side fixing bars 72 traverses to connect to a fist side bar 721 and a second side bar 722 at both ends of a side connecting deflecting bar, and the fist side bar 721 and the second side bar 722 are hollow bars, the uses can select to engage any end of the fist side bar 721 and the second side bar 722 to the first upper engagement bar 231 and the second upper engagement bar 232, respectively, according to the size of a placing object (not shown) such that the assembly in use has more flexibility. Besides, a locking element 738 can be used to lock into the locking hole 737 set at the fist side bar 721 and the second side bar 722 to strengthen the locating effect of engagement.

Of course, in another embodiment of the present invention, a fixing ring 57 can be fixed on the first lower engagement bar 233 or the second lower engagement bar 234. By the assembly of the fixing ring 57 and the side adapting hole 515 to strengthen the engaging effect of the first lower engagement bar 233, the second lower engagement bar 234, and the adaptor 51.

Figure 7:
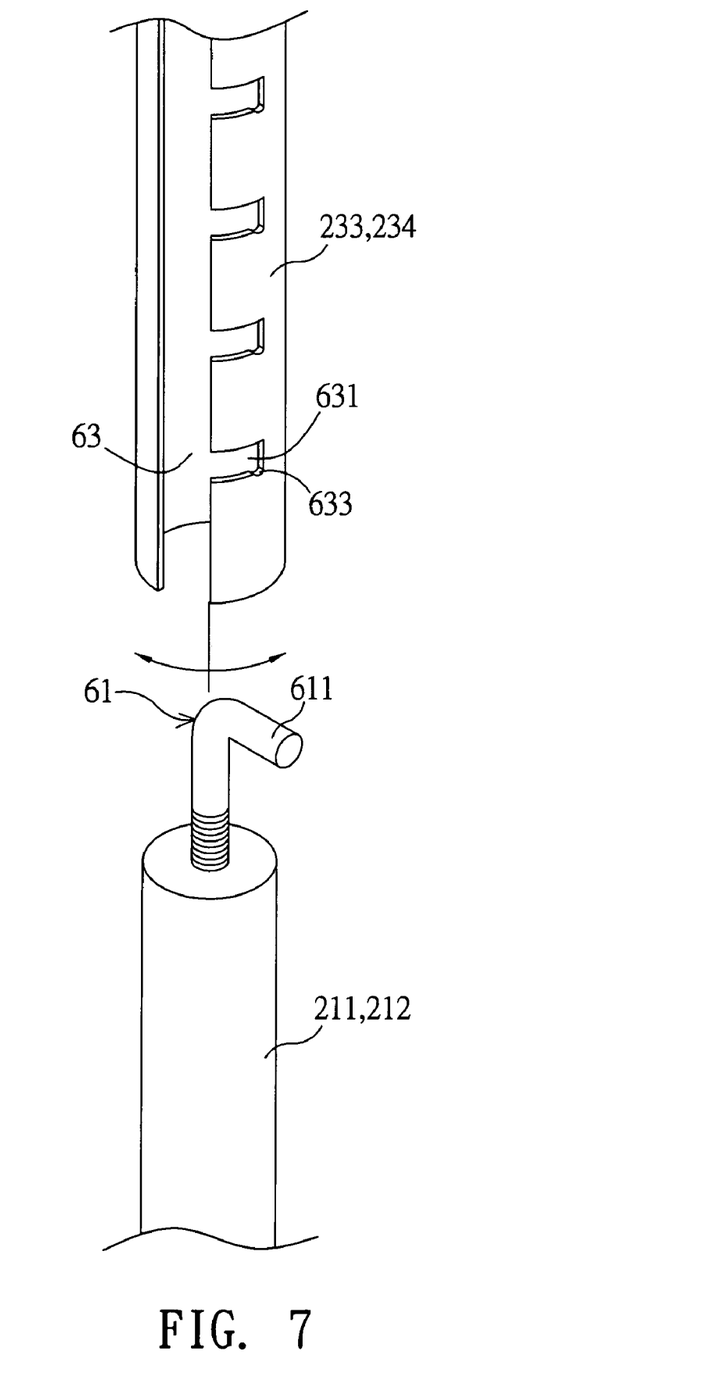
FIG. 7 is a stereoscopic diagram of a bottom locating device of another embodiment of the present invention.

Finally, referring FIG. 7, a stereoscopic diagram of another embodiment of the present invention. As shown, the main structure is generally the same as the embodiment as shown in FIG. 2A. However, a rotatable locating hook 61 is set at one end of the first bottom deflecting bar 211 and the second bottom deflecting bar 212, respectively. A bar socket 63 is set at a position corresponding to a hook part 611 of the locating hook 61 at the first lower engagement bar 233 and the second lower engagement bar 23, respectively. At least one side open socket 631 is set on the bar socket 63. Further, a locating socket 633 is set at one end of the side open socket 631 such that when the first bottom deflecting bar 211 and the second bottom deflecting bar 212 engage with the first lower engagement bar 233 and the second lower engagement bar 234 and slide, an object of localization can be achieved by combining the locating hook 61 and the side open socket 631. Further, by placing the locating socket 633, the locating effect can be strengthened thereby replacing the locating button (215) and the locating hole (235) of previous mentioned embodiment.

In summary, it is appreciated that the present invention is related to a mounting shelf and more particularly to a general computer host mounting shelf which no tools are needed to quickly adjust the size of the placing space and an object of securely carrying various computer hosts is achieved.

The foregoing description is merely one embodiment of present invention and not considered as restrictive. All equivalent variations and modifications in process, method, feature, and spirit in accordance with the appended claims may be made without in any way from the scope of the invention.

The invention claimed is:

1. A general computer host mounting shelf, comprising:
a set of bottom fixing bars comprising at least one bottom deflecting bar, a locating button set at an end of said bottom deflecting bar, and a bottom connecting bar traversing to connect to the other end of said bottom deflecting bar;
a set of side fixing bars comprising at least one side deflecting bar, a side connecting bar traversing to connect to an end of said side deflecting bar; and
an engagement socket comprising a substrate thereon at least one hollow upper engagement bar and at least one hollow lower engagement bar set;
wherein said side deflecting bar and said upper engagement bar can be engaged with each other, and at least one locating hole is chiseled at a position on said lower engagement bar corresponding to the locating button, such that when said bottom deflecting bar and said lower engagement bar are engaged with each other, an object of localization can be achieved by engaging said locating button and said locating hole.

2. The general computer host mounting shelf according to claim 1, wherein a bottom of said locating button is connected to a flange and an elastic object such that when said locating button passes through a penetration hole at said bottom deflecting bar, said flange can lock said penetration hole.

3. The general computer host mounting shelf according to claim 1, wherein a locking hole is set at one end of said upper engagement bar, and when said side deflecting bar and said upper engagement bar are engaged with each other, a locking element can be used to lock into said locking hole.

4. The general computer host mounting shelf according to claim 1 further comprising a sliding socket and a rail socket, a sliding rail set at a side of said rail socket, a sliding flange set at a side of said sliding socket to accommodate with said sliding rail such that said sliding socket and said rail socket can be sliding to shift correspondingly.

5. The general computer host mounting shelf according to claim 4, wherein a sliding socket hole is chiseled on said sliding socket, a substrate hole is chiseled at said substrate of said engagement socket, and a pivot joint element is used to pass through said sliding socket hole and said substrate hole such that said sliding socket and said substrate can rotate correspondingly.

6. The general computer host mounting shelf according to claim 1 further comprising a non-slip pad, selectively set at one of said side connecting bar, said bottom deflecting bar, said bottom connecting bar, and a combination thereof.

7. The general computer host mounting shelf according to claim 1, wherein said side deflecting bar and said side connecting bar are integrally formed as an unity, said upper engagement bar and said lower engagement bar are integrally formed as an unity, and said bottom deflecting bar and said bottom connecting bar are integrally formed as an unity.

8. The general computer host mounting shelf according to claim 1, wherein a locating hook replaces of said locating button, set at one end of said bottom deflecting bar, at least one bar socket chiseling on said lower engagement bar corresponding to a position of said locating hook, and a side open socket replacing said locating hole set on said bar socket.

9. The general computer host mounting shelf according to claim 8, wherein a locating socket is set at one end of said side open socket.

* * * * *